United States Patent
Dieffenderfer et al.

(10) Patent No.: US 8,438,371 B2
(45) Date of Patent: *May 7, 2013

(54) LINK STACK REPAIR OF ERRONEOUS SPECULATIVE UPDATE

(75) Inventors: James Norris Dieffenderfer, Apex, NC (US); Brian Michael Stempel, Raleigh, NC (US); Rodney Wayne Smith, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 2 days.

This patent is subject to a terminal disclaimer.

(21) Appl. No.: 13/108,227

(22) Filed: May 16, 2011

(65) Prior Publication Data

US 2011/0219220 A1 Sep. 8, 2011

Related U.S. Application Data

(63) Continuation of application No. 11/867,727, filed on Oct. 5, 2007, now Pat. No. 7,971,044.

(51) Int. Cl.
*G06F 9/30* (2006.01)

(52) U.S. Cl.
USPC .......................................... 712/242

(58) Field of Classification Search .................. None
See application file for complete search history.

(56) References Cited

U.S. PATENT DOCUMENTS

| 5,563,594 | A | 10/1996 | Ford et al. |
| 5,964,868 | A | 10/1999 | Gochman et al. |
| 6,151,671 | A | 11/2000 | D'sa et al. |
| 6,560,696 | B1 | 5/2003 | Hummel et al. |
| 6,848,044 | B2 | 1/2005 | Eisen et al. |
| 6,910,124 | B1 | 6/2005 | Sinharoy |
| 7,971,044 | B2 | 6/2011 | Dieffenderfer et al. |
| 2002/0129226 | A1 | 9/2002 | Eisen et al. |
| 2007/0204142 | A1 | 8/2007 | Dieffenderfer et al. |
| 2011/0320790 | A1 | 12/2011 | Dieffenderfer et al. |

OTHER PUBLICATIONS

Guan-Ying Chiu et al.: "Mechanism for Return Stack and Branch History Corrections Under Misprediction in Deep Pipeline Design" 2008 13th Asia-Pacific Computer Systems Architecture Conference, (Aug. 6, 2008), pp. 1-8, Piscataway, NJ, US Paragraphs 2.1 "Basic Operation of Return Adress Stack" and 2.2 "Branch Recover Table (BRT)".
International Search Report—PCT/US08/078789, International Search Authority—European Patent Office—Dec. 4, 2008.

(Continued)

*Primary Examiner* — Robert Fennema
(74) *Attorney, Agent, or Firm* — Nicholas J. Pauley; Peter Michael Kamarchik; Joseph Agusta (57) ABSTRACT

Whenever a link address is written to the link stack, the prior value of the link stack entry is saved, and is restored to the link stack after a link stack push operation is speculatively executed following a mispredicted branch. This condition is detected by maintaining a count of the total number of uncommitted link stack write instructions in the pipeline, and a count of the number of uncommitted link stack write instructions ahead of each branch instruction. When a branch is evaluated and determined to have been mispredicted, the count associated with it is compared to the total count. A discrepancy indicates a link stack write instruction was speculatively issued into the pipeline after the mispredicted branch instruction, and pushed a link address onto the link stack. The prior link address is restored to the link stack from the link stack restore buffer.

24 Claims, 4 Drawing Sheets

OTHER PUBLICATIONS

Skadron E et al: "Improving Prediction for Procedure Returns with Return-Address-Stack Repair Mechanisms" Micro-31. Proceedings of the 31st. Annual ACM/IEEE International Symposium on Microarchitecture. Dallas, TX, Nov. 30-Dec. 2, 1998; [Proceedings of the Annual ACM/IEEE International Symposium on Microarchitecture], Los Alamitos, CA: IEEE Comp. Soc., (Nov. 30, 1998), pp. 259-271, pp. 261-263, Paragraph 2.2 "Mis-Speculation Repair Mechanism".

Written Opinion—PCT/US08/078789, International Search Authority—European Patent OfficeDec. 4, 2008.

Dieffenderfer et al., "Link Stack Repair of Erroneous Speculative Update", U.S. Appl. No. 13/108,227, filed May 16, 2011 , 35 of pages.

LINK STACK REPAIR OF ERRONEOUS SPECULATIVE UPDATE

CLAIM OF PRIORITY UNDER 35 U.S.C. §120

The present Application for Patent is a continuation of patent application Ser. No. 11/867,727 entitled "LINK STACK REPAIR OF ERRONEOUS SPECULATIVE UPDATE" filed Oct. 5, 2007, pending, and assigned to the assignee hereof and hereby expressly incorporated by reference herein.

FIELD OF DISCLOSURE

The present invention relates generally to the field of processors and in particular to a system and method for repairing a link stack corrupted by speculative instruction execution.

BACKGROUND

Modern software is modular in nature, with specific functions being implemented in subroutines. To efficiently implement subroutine calls and returns, many modern processors employ circuits that implement (or emulate) a link stack. A link stack is a logical structure for storing link addresses that is visible only to the hardware and not directly accessible to the programmer. An instruction that calls (branches to) a subroutine, such as a branch and link instruction, "pushes" the address of the following instruction onto the link stack. Upon encountering a return-type instruction in the subroutine, the link stack is "popped" to yield the address of the instruction following the one that made the subroutine call. As subroutines call other subroutines, link addresses are successively pushed onto the link stack, and popped as the subroutines complete execution and return.

Most modern processors employ a pipelined architecture, where sequential instructions, each having multiple execution steps, are overlapped in execution. For maximum performance, the instructions should flow continuously through the pipeline. Any situation that causes instructions to stall in the pipeline detrimentally affects performance.

Virtually all real-world programs include conditional branch instructions, the actual branching behavior of which is not known until the instruction is evaluated deep in the pipeline. To avoid pipeline stalls that would result from waiting for actual evaluation of each branch instruction, many modern processors employ some form of branch prediction, whereby the branching behavior of conditional branch instructions is predicted early in the pipeline. Based on the predicted branch evaluation, the processor speculatively fetches and executes instructions from a predicted address—either the branch target address (if the branch is predicted taken) or the next sequential address after the branch instruction (if the branch is predicted not taken). When the actual branch behavior is determined, if the branch was mispredicted, the speculatively fetched instructions are flushed from the pipeline, and new instructions are fetched from the correct next address. Mispredicted branches adversely impact both performance and power consumption.

Another consequence of mispredicted branches may be corruption of the link stack. If speculatively executed instructions following a mispredicted branch include a subroutine return and subsequent call, a valid link address will be popped from the link stack and a new link address pushed onto the stack. Depending on the link stack hardware implementation, erroneously popping the link stack may not itself have adverse consequences, as popping the stack merely moves a read pointer; the data remain in the link stack buffer. Subsequently erroneously pushing a new value onto the link stack, however, may overwrite the previous value. When the branch misprediction is detected and the proper instruction stream is fetched and executed, a subroutine return will transfer control to the wrong location if the link stack corruption is not detected and repaired.

One way to avoid link stack corruption is to disallow link stack updates by speculative instructions. For example, link stack updates may be deferred until all conditional branches are resolved. This would effectively move link stack updates deep into the pipeline, as branch evaluation occurs in execute pipe stages deep in the pipeline. However, this would detrimentally affect performance for short subroutines by effectively denying them the use of the link stack functionality. Accordingly, to gain maximum performance from the link stack hardware, the link stack is preferably updated early in the pipeline, such as at a decode pipe stage.

One known approach to guarding against corruption of processor resources (such as register renaming buffers and the like) due to branch mispredictions is to maintain a parallel, "committed" copy of the resource. The committed copy is only updated when instructions that alter its state commit for execution. An instruction confirms its own execution when it is ascertained that no hazards exist that would preclude the instruction from completing execution. For example, an instruction that implements an arithmetic or logical operation may confirm execution when all of its operands are available (that is, they have been calculated by other instructions or have been successfully retrieved from memory). An instruction commits for execution when it, and all instructions ahead of it in the pipeline, are confirmed.

To avoid corruption due to branch mispredictions, the state of a working copy of a processor resource is altered on an ongoing basis during the routine execution of instructions; however, the state of a committed copy of the processor resource is only altered by instructions that have committed for execution. When a branch misprediction is detected, the committed copy of the processor resource is copied over to, and replaces the contents of, the working copy. This technique places the working copy in a state it had prior to the speculative execution of any instruction.

It is possible to employ this approach to the link stack corruption problem. A working link stack would be updated by instructions in the pipeline implementing subroutine calls and returns. A committed link stack would only be updated by subroutine call and return instructions that have committed for execution. Upon discovering a branch misprediction, the committed copy of the link stack would simply be copied over to be working link stack. However, this approach is costly in terms of both silicon area and power consumption. Replicating the link stack requires duplicating the registers or other memory structures that implement it, along with the control logic necessary to manage the link stacks. The extra hardware occupies valuable integrated circuit area, increases wiring congestion, and complicates clock and power distribution. Continuously updating two complete link stacks consumes, nominally, twice the power of running only one link stack. Particularly in processors deployed in mobile electronic devices, minimizing power consumption is critical to preserve battery life and reduce heat dissipation.

SUMMARY

According to one or more embodiments disclosed and claimed herein, link stack corruption is detected and efficiently repaired. Whenever a link address is written to the link stack, the prior value of the link stack entry is saved in a link stack restore buffer. This value is restored to the link stack when an erroneous link stack push operation is detected. An erroneous link stack push operation is one that is speculatively executed following a mispredicted branch. This condition is detected by maintaining a count of the total number of uncommitted link stack write instructions in the pipeline, and a count of the number of uncommitted link stack write instructions ahead of each branch instruction. When a branch is evaluated and determined to have been mispredicted, the count associated with it is compared to the total count. A discrepancy indicates a link stack write instruction was speculatively issued into the pipeline after the mispredicted branch instruction, and pushed a link address onto the link stack. In this case, the prior link address is restored to the link stack from the link stack restore buffer.

One embodiment relates to a method of managing a link stack comprising a plurality of entries, each operative to store a link address. Upon writing any new link address to the link stack, the prior value of the link stack entry is saved. The branch evaluation of a branch instruction is predicted. In response to the prediction, instructions are speculatively executed. The branch evaluation is determined to have been mispredicted. The link stack is determined to have been speculatively written. The saved value is restored to the link stack.

Another embodiment relates to a processor. The processor includes an instruction execution pipeline and a link stack comprising a plurality of entries, each operative to store a link address. The processor further includes a link stack restore buffer operative to store a prior value of a link stack entry upon any link stack entry being overwritten with a new link address, and further operative to restore the prior value to the link stack entry upon a detection that the link stack write that displaced it was speculative and erroneous. The processor also includes a link stack monitor circuit operative to detect erroneous, speculative writes to the link stack.

Yet another embodiment relates to a processor. The processor includes an instruction execution pipeline and a link stack comprising a plurality of entries, each operative to store a link address. The processor further includes a link stack restore buffer operative to store a prior value of a link stack entry upon any link stack entry being overwritten with a new link address, and further operative to restore the prior value to the link stack entry upon a detection that the link stack write that displaced it was speculative and erroneous. The processor also includes an up/down counter operative to maintain a count of uncommitted link stack write instructions in the pipeline by incrementing upon decoding a link stack write instruction and decrementing upon a link stack write instruction committing for execution. The processor further includes a counter associated with each uncommitted branch instruction in the pipeline, the counter operative to maintain a count of uncommitted link stack write instructions ahead of the branch instruction in the pipeline by initializing to the up/down counter value upon decoding a branch instruction and decrementing upon a link stack write instruction committing for execution. The processor still further includes a comparator operative to detect an erroneous, speculative link stack write operation by comparing the up/down counter value to the value of the counter associated with a mispredicted branch instruction.

DETAILED DESCRIPTION

Figure 1:
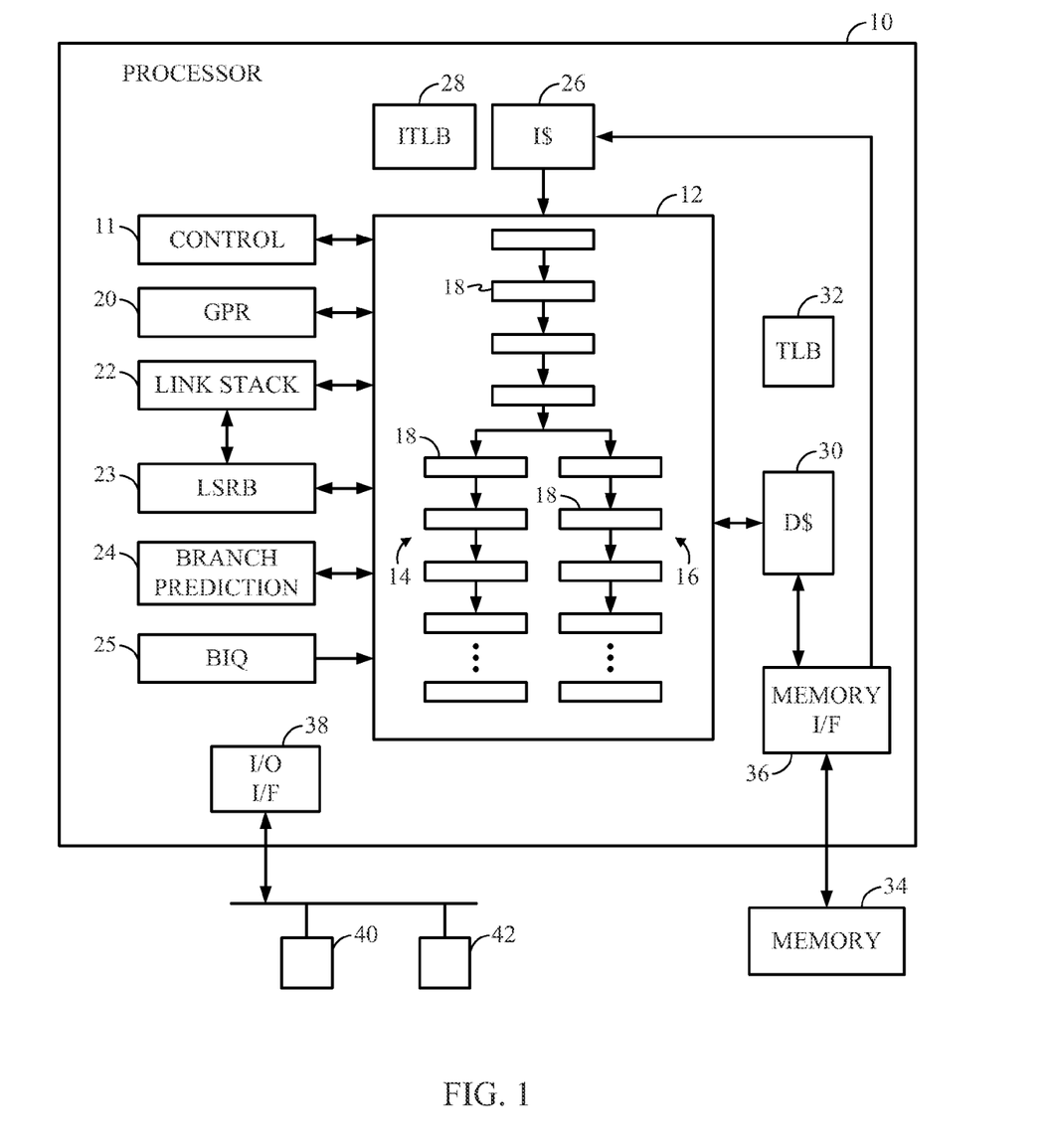
FIG. 1 is a functional block diagram of a processor.

FIG. 1 depicts a functional block diagram of a processor 10 including circuits to efficiently repair corruption of a link stack due to branch mispredictions. The processor 10 executes instructions in an instruction execution pipeline 12 according to control logic 11. The pipeline 12 may be a superscalar design, with multiple parallel execution pipelines 14, 16. The pipeline 12 includes various registers or latches 18, organized in pipe stages, as well as logical and computational circuits such as arithmetic logic units (ALU) (not shown). A general purpose register (GPR) file 20 provides registers comprising the top of the memory hierarchy. Other processor resources supporting the pipeline 12 are a link stack 22, link stack restoration buffer (LSRB) 23, branch prediction circuit 24, and branch information queue (BIQ) 25, the operation of which are further explicated herein.

The pipeline 12 fetches instructions from an instruction cache (I-Cache or I$) 26, with memory addressing and permissions managed by an instruction-side translation lookaside buffer (ITLB) 28. Data is accessed from a data cache (D-Cache or D$) 30, with memory addressing and permissions managed by a main translation lookaside buffer (TLB) 32. In various embodiments, the ITLB 28 may comprise a copy of part of the TLB 32. Alternatively, the ITLB 28 and TLB 32 may be integrated. In some embodiments, a dedicated data-side TLB, or DTLB (not shown), may be completely separate from the ITLB 28. Similarly, in various embodiments of the processor 10, the I-cache 26 and D-cache 30 may be unified.

Misses in the I-cache 26 and/or the D-cache 30 cause an access to main (off-chip) memory 34, under the control of a memory interface 36 (other caches, not shown, may be interposed between the processor 10 and main memory 34). The processor 10 may include an Input/Output (I/O) interface 38, controlling access to various peripheral devices 40, 42. Those of skill in the art will recognize that numerous variations of the processor 10 are possible. For example, the processor 10 may include a second-level (L2) cache for either or both the I and D caches 26, 30. In addition, one or more of the functional blocks depicted in the processor 10 may be omitted from a particular embodiment.

Figure 2:
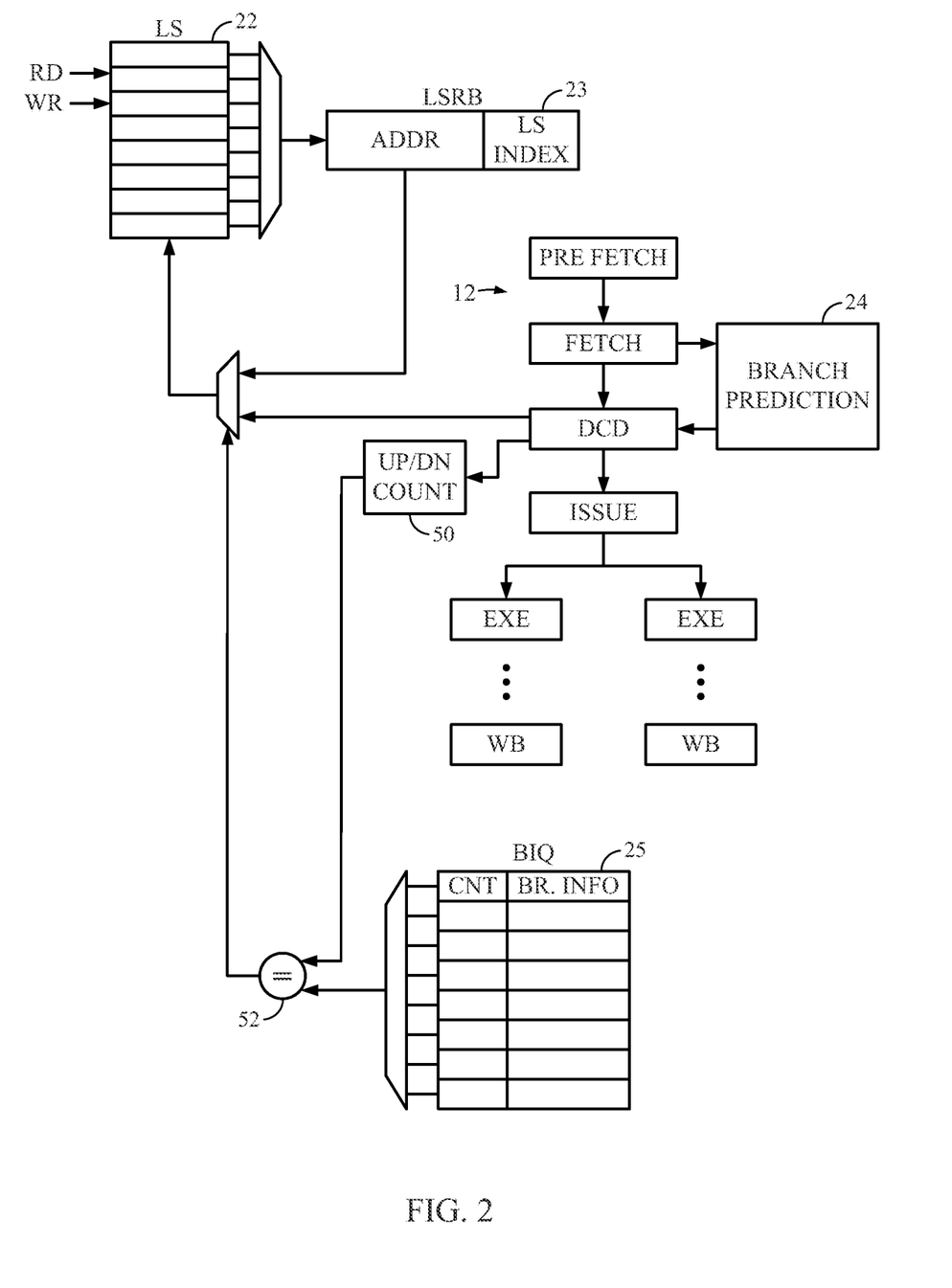
FIG. 2 is a functional block diagram of selected portions of the processor.

FIG. 2 is a functional block diagram depicting operation of the link stack restore buffer 23 to repair corruption of the link stack 22 resulting from mispredicted branches. Low-level details, such as control circuits and signals, are omitted from FIG. 2 for clarity. In the embodiment depicted, the link stack 22 is implemented as a circular buffer, in this case comprising 8 registers, by incrementing and decrementing read and write pointers, as well known in the art. This implementation is not limiting, and embodiments of the present invention may advantageously be applied to a link stack 22 implemented using any hardware structure known in the art or yet to be invented.

A link stack restore buffer 23 maintains a copy of the last link address overwritten by a link stack push operation. That is, as a branch and link instruction writes a link address to the link stack 22, the prior address stored in the corresponding link stack entry is automatically saved to the link stack restore buffer 23. Additionally, in the embodiment depicted, the link stack index is stored, so that the link address may be restored, if necessary, to the location in the link stack 22 at which it was overwritten. In the embodiment depicted, the link stack restore buffer 23 comprises a single register. However, the present invention is not limited to this embodiment. In other embodiments, particularly in processors having very deep pipelines, the link stack restore buffer 23 may comprise multiple entries, and maybe organized as a stack, buffer, or other logical structure as required or desired.

Link addresses are written to the link stack 22 as subroutine call (e.g., branch and link) instructions are executed in the pipeline 12. Link addresses are preferably written early in the pipeline 12, such as at a decode pipe stage, as in the embodiment depicted in FIG. 2. This allows short subroutines to take advantage of the link stack 22 hardware. However, in other embodiments, the link stack 22 may be written at any pipe stage, as required or desired for a particular pipeline 12. If the instruction stream including the link stack write instruction is speculatively fetched in response to a branch prediction, it is possible that the link stack write operation may override a valid link address. Accordingly, the prior link address is saved to the link stack restore buffer 23 when the new value is written to the link stack 22. When the branch misprediction is detected, if the link stack write is determined to have been erroneous, the prior value stored in the link stack restore buffer 23 may be restored to the link stack 22 entry at which it was overwritten.

Figure 3:
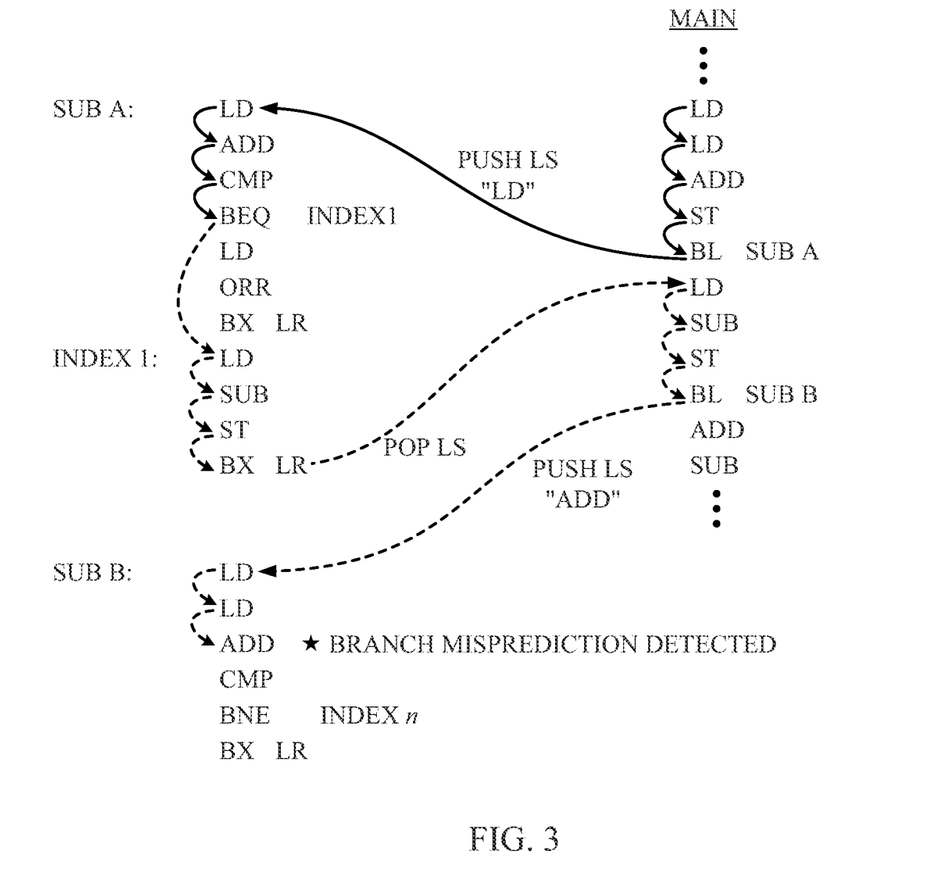
FIG. 3 is a code flow diagram.

FIG. 3 depicts a hypothetical sequence of instructions that demonstrates how the link stack 22 may be corrupted in response to a mispredicted branch. A main program sequence (on the right) executes two load (LD) instructions, an ADD, and a store (ST), then a branch and link instruction calling subroutine A (BL SUB A). This is a proper code sequence, as represented by solid-line arrows depicting program flow. The BL SUB A instruction pushes the address of the following LD instruction onto the link stack, and branches to subroutine A, where LD, ADD, and compare (CMP) instructions are executed.

When the pipeline 12 fetches the instructions for subroutine A, the branch if equal (BEQ) instruction is detected, and a predicted branch direction and next address are formulated in a branch prediction circuit 51. In this example, the branch is erroneously predicted taken, with a branch target of index 1. Instructions are fetched beginning at index 1 and speculatively executed, as indicated by dashed-line arrows depicting program flow. The execution stream thus branches to the LD instruction at index 1, skipping over the first branch to link return instruction BX LR (which is the first exit point from subroutine A).

The LD, subtract (SUB), and ST instructions are speculatively executed, and the BX LR instruction branches to the link address at the top of the link stack 22, popping the link stack 22 by moving the read pointer. In the link stack embodiment depicted in FIG. 2, popping the link stack 22 does not corrupt any entry. That is, upon detecting the mispredicted branch, the link stack 22 read pointer may simply be reset to its prior position.

Speculative program execution continues along the main program flow, executing LD, SUB, and ST instructions. A call to subroutine B is then speculatively executed, branching to the LD instruction in subroutine B and pushing the address of the following main program ADD instruction onto the link stack 22. The link stack 22 push operation overwrites the prior value of the link stack entry, which contains the address of the earlier main program LD instruction. According to embodiments of the present invention, when the address of the ADD instruction is pushed onto the link stack 22, the address of the LD instruction is saved in the link stack restore buffer 23. Speculative execution continues at subroutine B, executing two LD instructions and an ADD.

At this point, the earlier, mispredicted branch instruction has progressed through the pipeline 12 and is evaluated in an execution pipe stage. The branch misprediction is detected, and the pipeline 12 is flushed of all instructions following the mispredicted branch instruction (the BEQ to index 1 in Subroutine A). The erroneous push operation to the link stack 22 is also detected (as described in greater detail herein), and the address of the main program LD instruction is written from the link stack restore buffer 23 to the proper entry in the link stack 22 (that is, the link stack index saved, along with the link address, in the link stack restore buffer 23), overwriting the erroneous address of the main program ADD instruction. The link stack 22 read and write pointers are also reset, and instructions following the mispredicted branch instruction are fetched and executed (i.e., beginning with the LD following the BEQ to index 1). After the LD and ORR instructions are executed, the branch to link return instruction branches to the LD instruction in the main program (not the ADD, to which the corrupted link stack 22 would have directed it), and proper instruction execution continues.

Referring back to FIG. 2, erroneous, speculative writes to the link stack 22 are detected by comparing, for each predicted branch instruction, a count of the total number of uncommitted link stack write instructions in the pipeline 12 with a count of the number of uncommitted link stack write instructions ahead of the branch instruction in the pipeline 12. A discrepancy in these two counts indicates a link stack write instruction—that pushed a link address onto the link stack 22—behind the relevant branch instruction. If that branch instruction is determined to have been mispredicted, the push operation is known to have been both speculative and erroneous, and may be repaired by restoring the link address saved in the link stack repair buffer 23.

When an instruction that writes to the link stack 22, such as a branch and link construction, is decoded in the pipeline 12, the link address is written to the link stack 22, and an up/down counter 50 is incremented. In the embodiment depicted in FIG. 2, this occurs at the decode pipe stage, although the present invention is not limited to this implementation. When each instruction that writes to the link stack 22 commits for execution in the pipeline 12, the up/down counter 50 is decremented. The value of the up/down counter 50 thus indicates the number of uncommitted link stack write instructions that are "in-flight" in the pipeline 12, regardless of the order of instructions in the pipeline 12.

Many processors that support branch prediction and speculative instruction execution include a branch information queue (BIQ) 25. The BIQ 25 stores information about in-flight branch instructions, such as the branch prediction, predicted branch target address, and the like. Each entry in the BIQ 25 is associated with a unique uncommitted (i.e., in-flight) branch instruction. According to one or more embodiments of the present invention, a count field is defined in each BIQ 25 entry, and accordingly is associated with each uncommitted branch instruction. When a branch instruction leaves an early pipe stage such as the decode pipe stage, the current value of the up/down counter 50 is copied into the count field of the BIQ entry associated with that branch instruction. This value represents the number of uncommitted link stack write instructions in the pipeline 12, and hence ahead of the branch instruction. The BIQ count field value is decremented every time an instruction that writes to the link stack 22 commits for execution in the pipeline 12. The BIQ count field value thus represents the number of uncommitted link stack write instructions ahead of the associated branch instruction in the pipeline 12.

The BIQ count field is initialized with the value of the up/down counter 50. Both the BIQ count field and the up/down counter 50 are decremented by link stack write instructions committing. The up/down counter 50 is incremented by newly decoded link stack write instructions; the BIQ count field is never incremented. Accordingly, the two count values will track each other only if no new link stack write instructions enter the pipeline 12 after the relevant branch instruction. Conversely, a discrepancy in the two count values indicates that at least one new link stack write instruction entered the pipeline 12 after the relevant branch instruction.

When a branch instruction evaluates in the pipeline 12 and is determined to have been mispredicted, all instructions following the mispredicted branch instruction are flushed from the pipeline 12, as known in the art. Additionally, the BIQ count field associated with the mispredicted branch instruction is compared to the value of the up/down counter 50 at comparator 52. If the two counts are the same, the number of uncommitted link stack write instructions ahead of the mispredicted branch instruction equals the total number of uncommitted link stack write instructions in the pipeline 12, which means that there are no uncommitted (speculatively executed) link stack write instructions behind the mispredicted branch. Accordingly, no link stack 22 repair is required.

However, if the BIQ count field differs from the value of the up/down counter 50, at least one link stack write instruction was decoded after the BIQ entry was created for the mispredicted branch instruction, which means the link stack 22 was written by an instruction speculatively executed in response to a branch misprediction, and may need to be repaired by restoring the contents of the link stack repair buffer 23 to the link stack 22. This is indicated functionally by the output of the compare circuit 52 multiplexing the input to the link stack 22 between the link stack repair buffer 23 and the pipeline 12. Those of skill in the art will recognize that actual implementations will differ. The up/down counter 50, the plurality of BIQ count fields, the comparator 52, and other implementation logic (not shown) comprise a link stack monitor circuit.

In the embodiment depicted in FIG. 2, the link stack repair buffer 23 comprises a single entry. In this case, the comparator 52 may implement a simple bit-wise XOR function, with a reduction AND. In other embodiments, where two or more link addresses may be saved in the link stack repair buffer 23, a numerical comparison between the up/down counter 50 value and the BIQ count field will indicate the number of link stack write operations that followed the mispredicted branch, and which will be repaired. Note that the XOR/AND function may fail to detect a corrupted link stack 22 in the event that 2.sup.n link stack write instructions followed the mispredicted branch instruction, where n is the width of the BIQ count field (causing the count field to "wrap"). For n>=2, this is unlikely unless the pipeline 12 is extremely deep.

In at least the embodiment of the link stack 22 depicted in FIG. 2—that is, implemented as a circular buffer—a speculative link stack write instruction (push) will not corrupt a link stack 22 entry, unless a speculative link stack read instruction (pop) precedes it. Accordingly, in one embodiment the stored value from the link stack repair buffer 23 is restored to the link stack 22 only if it is detected that a speculative link stack pop operation preceded the erroneous, speculative link stack push. In another embodiment, the stored value from the link stack repair buffer 23 is restored to the link stack 22 only if both speculative link stack pop and push operations are detected, but without regard to their relative order of execution. In one embodiment, the speculative link stack pop detection may be implemented similarly to that described herein for detecting a speculative link stack push operation—that is, maintaining a pipeline-wide speculative link stack read instruction up/down counter, and a speculative link stack read instruction count associated with each branch instruction, and comparing the two values if a branch is determined to have been mispredicted.

Figure 4:
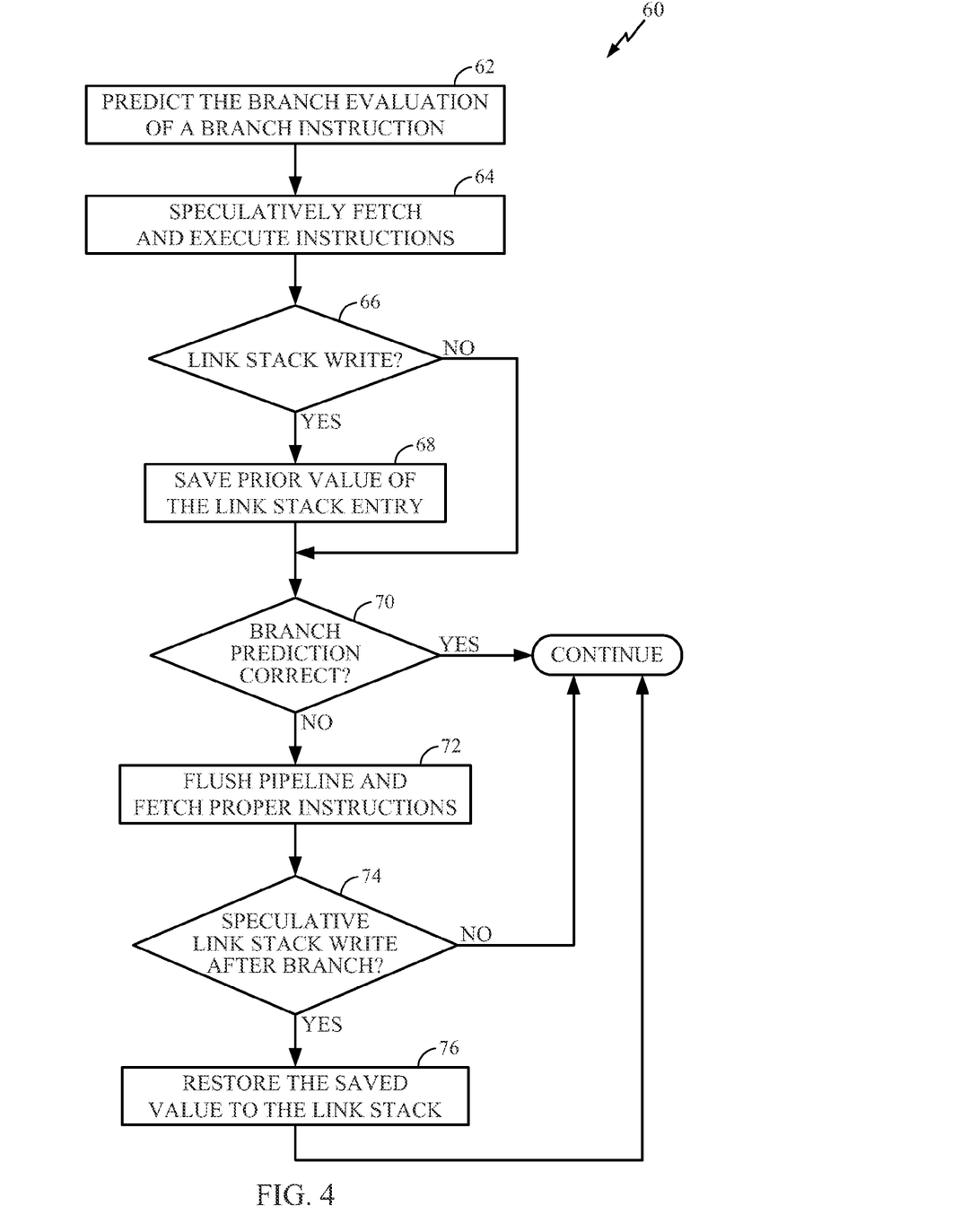
FIG. 4 is a flow diagram of a method of link stack management.

FIG. 4 depicts a flow diagram of a method 60 of managing a link stack. The evaluation of a branch instruction is predicted (block 62). Based on the branch prediction, instructions are speculatively fetched from the next sequential address or a predicted branch target address, and executed (block 64). Any time an instruction (including a speculatively executed instruction) writes the link stack 22 (block 66), the prior value of the overwritten link stack entry is saved in a link stack restore buffer 23 (block 68). When the branch instruction is evaluated in an execute pipe stage, if the branch prediction was correct (block 70), pipeline operation continues normally. If the branch was mispredicted (block 70), the speculative instructions are flushed from the pipeline and proper instructions are fetched from either the address following the branch instruction or the calculated branch target address (block 72).

Whether a speculative instruction—that is, an instruction following the branch instruction—wrote the link stack 22 is ascertained (block 74). In one embodiment, this comprises maintaining an ongoing count of all uncommitted link stack write instructions in the pipeline, and a count of all uncommitted link stack write instructions ahead of each branch instruction, and comparing the count associated with the mispredicted branch instruction to the total count. If no instruction following the mispredicted branch instruction wrote the link stack 22 (block 74), pipeline operation continues normally. If a speculative instruction wrote the link stack 22, the prior link stack entry value may be restored from the link stack restore buffer 23 (block 76), at the stored link stack index, and pipeline operation continues normally. In some embodiments, the link stack 22 restore only occurs if a speculative read instruction also popped the link stack 22.

In one embodiment, the single-entry link stack repair buffer 23 comprises 32 bits for the link address and a mode bit (e.g., an ARM/Thumb mode bit), and a 3-bit index (for an 8-entry link stack 22). Each BIQ count field may comprise only 2 or 3 bits, depending on the depth of the pipeline 12. Accordingly, the hardware impact of this approach is minimal Simulation of the single-entry link stack repair buffer 23 yielded greater than 20% increase in link stack accuracy over no link stack repair mechanism. Simulation of deeper link stack repair buffers yielded negligible additional accuracy increase. Of course, these results depend on numerous factors, including the pipeline depth, code characteristics, and the like. In general, those of skill in the art will be able to choose a link stack repair buffer depth that balances performance and power savings with design complexity and silicon area for any particular processor implementation, given the teachings of this disclosure. Even with multiple link stack repair buffer entries (and the concomitant complexity of the counter comparisons), embodiments of the present invention provide a far more efficient solution to corrupted link stack repair than a separate, "committed" link stack. Furthermore, link stack 22 operations occur early in the pipeline 12, providing link stack optimization for even short subroutines.

As used herein, a "link stack write instruction" is any instruction, such as a branch and link instruction, that pushes a link address onto the link stack, even if the instruction implements other functionality (such as program flow redirection). As used herein, a "counter" may comprise a hardware counter operative to increment and/or decrement a stored value, or may comprise a bit field in a buffer whose value is incremented and/or decremented by reading the value, performing the operation, and writing a new value to the bit field.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A method of managing a link stack comprising a plurality of entries, each entry operative to store a link address, the method comprising:
speculatively reading a first link address from a link stack entry of the link stack;
saving the first link address in a link stack restore buffer in response to determining that a speculative write following the speculative read would overwrite the first link address at the link stack entry, wherein determining that the speculative write following the speculative read would overwrite the first link address at the link stack entry comprises:
maintaining a first count of a total number of uncommitted link stack write instructions in a pipeline;
maintaining a second count, associated with each uncommitted branch instruction, of a number of uncommitted link stack write instructions ahead of the uncommitted branch instruction in the pipeline; and
upon detecting that a branch was mispredicted, comparing the second count to the first count and detecting that the first and second counts are not the same; and
speculatively writing a second link address to the link stack entry after speculatively reading the first link address, wherein the first link address of the link stack entry is overwritten by the second link address.

2. The method of claim 1, wherein the link stack restore buffer is separate from the link stack.

3. The method of claim 1, further comprising:
detecting that a branch evaluation was mispredicted; and
restoring the saved first link address from the link stack restore buffer to the link stack in response to detecting that the link stack was speculatively written.

4. The method of claim 1, further comprising storing a link stack index of the link stack entry corresponding to the first link address in the link stack restore buffer.

5. The method of claim 1, wherein the link stack restore buffer comprises a plurality of entries.

6. The method of claim 1, wherein maintaining the first count of the total number of uncommitted link stack write instructions in the pipeline comprises:
incrementing a first counter upon decoding a link stack write instruction; and
decrementing the first counter when the link stack write instruction commits for execution.

7. The method of claim 6, wherein maintaining the second count of each uncommitted branch instruction, of the uncommitted link stack write instructions ahead of it in the pipeline comprises:
copying a value of the first counter to a second counter associated with the branch instruction upon decoding the branch instruction; and
decrementing the second counter when the link stack write instruction commits for execution.

8. The method of claim 1, wherein the second counter associated with the branch instruction is a field in a branch instruction queue entry associated with the branch instruction.

9. A processor comprising:
a link stack comprising a plurality of entries, each entry operative to store a link address;
a read circuit configured to speculatively read a first link address from a link stack entry of the link stack;
a detection circuit configured to generate an indication that a speculative write following the speculative read would overwrite the first link address at the link stack entry, wherein the detection circuit comprises:
a first counter configured to maintain a first count of a total number of uncommitted link stack write instructions in a pipeline;
a second counter configured to maintain a second count, associated with each uncommitted branch instruction, of a number of uncommitted link stack write instructions ahead of the uncommitted branch instruction in the pipeline; and
comparison logic configured to compare the second count to the first count upon detecting that a branch was mispredicted, and the comparison logic further configured to generate an indication if the first and second counts are not the same;
a link stack restore buffer configured to save the first link address in response to the indication from the detection circuit; and
a write circuit configured to speculatively write a second link address to the link stack entry after the speculative read of the first link address, wherein the first link address of the link stack entry is overwritten by the second link address.

10. The processor of claim 9, wherein the link stack restore buffer is separate from the link stack.

11. The processor of claim 9, further comprising:
a branch evaluation circuit configured to detect that a branch evaluation was mispredicted; and
the write circuit further configured to restore the saved first link address from the link stack restore buffer to the link stack in response to a detection that the link stack was speculatively written.

12. The processor of claim 9, wherein the link stack restore buffer is further configured to store a link stack index of the link stack entry corresponding to the first link address.

13. The processor of claim 9, wherein the link stack restore buffer comprises a plurality of entries.

14. The processor of claim 9, wherein:
the first counter is configured to be incremented upon decoding a link stack write instruction; and
the first counter is configured to be decremented when the link stack write instruction commits for execution.

15. The processor of claim 14, wherein
the second counter is further configured to store the first count as the second count, upon decoding the branch instruction; and
the second counter is configured to decrement the second count when the link stack write instruction commits for execution.

16. The processor of claim 9, wherein the second counter is a field in a branch instruction queue entry associated with the branch instruction.

17. A system for managing a link stack comprising a plurality of entries, each entry operative to store a link address, the system comprising:
means for speculatively reading a first link address from a link stack entry of the link stack;
means for generating an indication that a speculative write following the speculative read would overwrite the first link address at the link stack entry, wherein the means for generating an indication that the speculative write following the speculative read would overwrite the first link address at the link stack entry comprises:
  means for maintaining a first count of a total number of uncommitted link stack write instructions in a pipeline;
  means for maintaining a second count, associated with each uncommitted branch instruction, of a number of uncommitted link stack write instructions ahead of the uncommitted branch instruction in the pipeline; and
  means for comparing the second count to the first count upon detecting that a branch was mispredicted, and means for detecting that the first and second counts are not the same;
buffer means for saving the first link address in response to the indication; and
means for speculatively writing a second link address to the link stack entry after speculatively reading the first link address, wherein the first link address of the link stack entry is overwritten by the second link address.

18. The system of claim 17, wherein the buffer means is separate from the link stack.

19. The method of claim 17, further comprising:
  means for detecting that a branch evaluation was mispredicted; and
  means for restoring the saved first link address from the buffer means to the link stack in response to detecting that the link stack was speculatively written.

20. The system of claim 17, further comprising means storing a link stack index of the link stack entry corresponding to the first link address in the buffer means.

21. The system of claim 17, wherein the buffer means comprises a plurality of entries.

22. The system of claim 17, wherein the means for maintaining the first count of the total number of uncommitted link stack write instructions in the pipeline comprises:
  means for incrementing a the first count upon decoding a link stack write instruction; and
  means for decrementing the first count when the link stack write instruction commits for execution.

23. The system of claim 22, wherein means for maintaining the second count of each uncommitted branch instruction, of the uncommitted link stack write instructions ahead of it in the pipeline comprises:
  means for copying the first count to the second count; and
  means for decrementing the second count when the link stack write instruction commits for execution.

24. A non-transitory computer-readable storage medium comprising code, which, when executed by a processor, causes the processor to perform operations for managing a link stack comprising a plurality of entries, each entry operative to store a link address, the non-transitory computer-readable storage medium comprising:
  code for speculatively reading a first link address from a link stack entry of the link stack;
  code for generating an indication that a speculative write following the speculative read would overwrite the first link address at the link stack entry, wherein the code for generating an indication that the speculative write following the speculative read would overwrite the first link address at the link stack entry comprises:
    code for maintaining a first count of a total number of uncommitted link stack write instructions in a pipeline;
    code for maintaining a second count, associated with each uncommitted branch instruction, of a number of uncommitted link stack write instructions ahead of the uncommitted branch instruction in the pipeline; and
    code for comparing the second count to the first count upon detecting that a branch was mispredicted, and means for detecting that the first and second counts are not the same;
  code for saving the first link address in a link stack restore buffer, in response to the indication; and
  code for speculatively writing a second link address to the link stack entry after speculatively reading the first link address, wherein the first link address of the link stack entry is overwritten by the second link address.

* * * * *